UNITED STATES PATENT OFFICE.

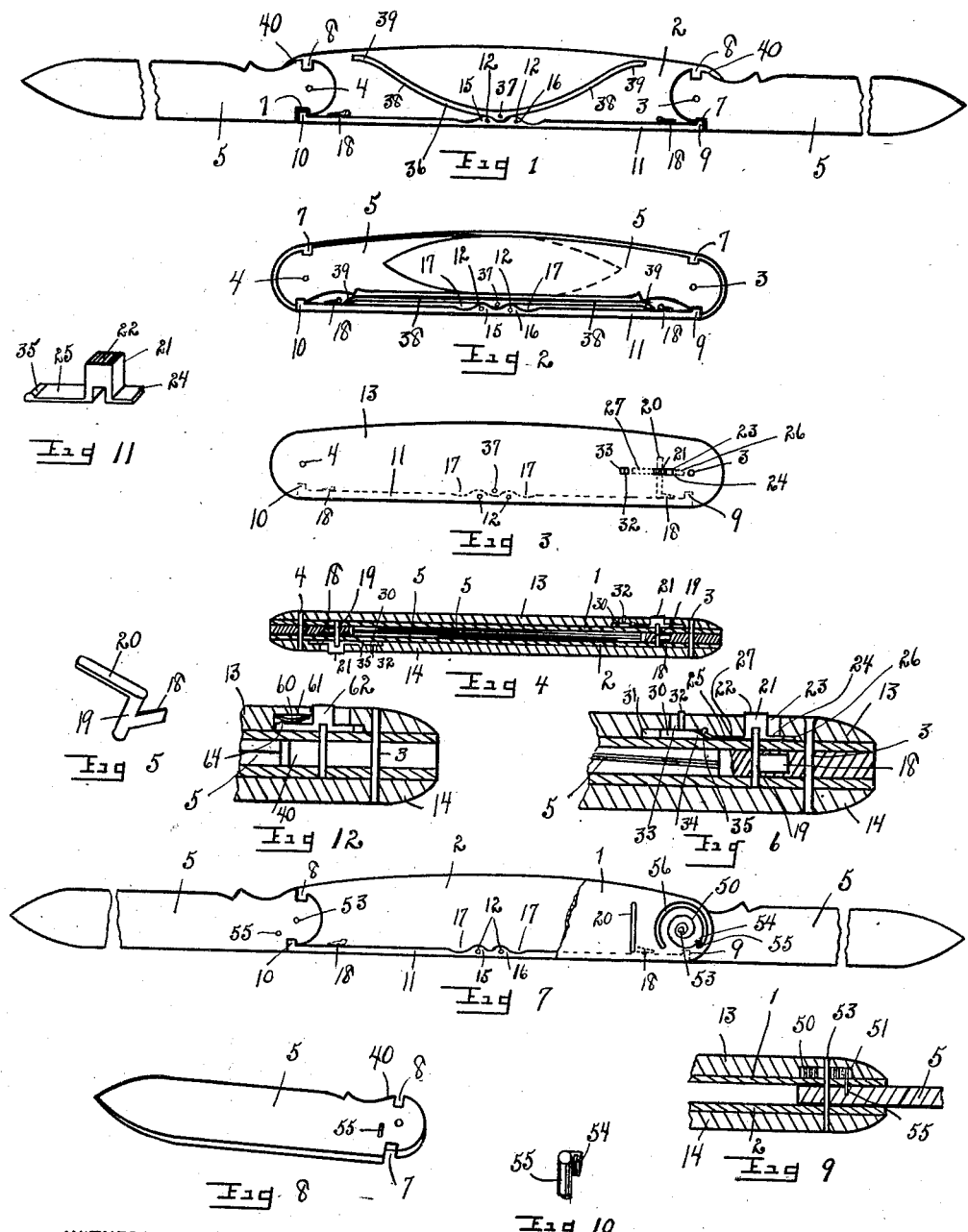

KARL H. ROTH, OF UTICA, NEW YORK.

KNIFE.

1,090,416.

Specification of Letters Patent. Patented Mar. 17, 1914.

Application filed April 10, 1913. Serial No. 760,220.

*To all whom it may concern:*

Be it known that I, KARL H. ROTH, a citizen of Germany, residing at Utica, in the county of Oneida and State of New York, have invented certain new and useful Improvements in Knives, of which the following is a specification, reference being had therein to the accompanying drawing.

My invention relates to a knife, and I declare the following to be a full, clear, concise, and exact description thereof, sufficient to enable anyone skilled in the art to which it appertains, to make and use the same, reference being had to the accompanying drawings in which like reference characters refer to like parts throughout the specification.

The object of the invention is to provide a knife that will be efficient and of simple construction, and adapted to have its blades open in an automatic manner.

Other features will be understood from the drawings, in which:

Figure 1 is a plan view of the knife, with the blades in open position and the top portions of the knife removed; Fig. 2 is a similar view to that of Fig. 1, showing the blades in closed position; Fig. 3 is a plan view of the knife, showing the blades in closed position; Fig. 4 is a rear elevation of the knife, showing the blades in closed position, certain parts in section, and a spring removed; Fig. 5 is an enlarged perspective detail view of a lever and immediate parts, employed on the knife; Fig. 6 is an enlarged fragmentary view of the end portion of the knife, showing parts in section and the spring removed; Fig. 7 is a plan view of the knife, blades being in open position, and showing a certain modification with respect to the spring for opening the blades, the cover portion being removed; Fig. 8 is a perspective view of the blade, showing a stud attached thereto; Fig. 9 is an enlarged fragmentary view of the end portion of the modified construction shown in Fig. 7, parts being shown in section; Fig. 10 is an enlarged perspective view of a stud, used in the modified construction, and showing a bracket secured thereto; Fig. 11 is an enlarged perspective view of a slide employed; Fig. 12 is an enlarged fragmentary view of the end portion of the knife, showing a certain modification with respect to locking the sliding member.

Referring more particularly to the drawings, there are members 1 and 2, between which are pivotally supported at 3 and 4, blades 5. Blades 5 are of similar construction and are provided with recesses 7 and 8, which are adapted to be engaged by the heads 9 and 10 of spring 11, whereby said blades 5 may be held in open position, as shown in Fig. 1, or in closed position, as shown in Fig. 2. Spring 11 is held in assembled position by rivets 12, that pass through members 1 and 2 and the cover portions 13 and 14 of the knife. Said spring 11 is enlarged slightly at portions 15 and 16, whereby to provide room for rivets 12, and is recessed at portions 17—17, so that the greater portion of the yield of spring 11 will fall upon said portions 17, and thereby increase the resiliency of the end portions of the spring 11. Heads 9 and 10 of the spring 11 are disengaged from recesses 7 and 8 of the blades 5 by members 18, formed integral with the pivots 19, having bearings in members —1— and 2. Pivots 19 are turned by means of levers 20, which are formed integral with pivots 19. The levers 20 are actuated by slides 21, provided with corrugated surfaces 22, that project through apertures 23 in the cover portions 13 and 14, there being a slide 21 on either side of the knife for either blade 5. Said slides 21 have reduced forward extension 24 and rearward extension 25. Said extensions 24 and 25, slide in apertures 26 and 27, respectively, in the cover portions 13 and 14 of the knife. The rearward extension 25 of the slides 21 is of very little thickness, whereby there is formed a spring in that part, which spring will readily bend when acted upon by the locking members 30.

The means for locking the slides 21, when the blades 5 are in closed position, and thereby prevent the accidental opening of the blades 5, while the knife is being carried in the pocket, comprises the members 30—30, which are mounted in recesses 31—31 in members 13 and 14 of the knife. The members 30 are actuated by studs 32, which are housed in recesses 33, and project above the surface of the cover portions 13 and 14, so that they may be easily manipulated. In order to lock the slides 21 in given position, the members 30 are forced under the rearward extensions 25 of the slides 21. The end portions of members 30 are beveled at 34 for the purpose. The projection of the members 30 under the portions 25 of the slides 21, causes said portions 25 of the slides 21 to be raised and thereby lodge knobs 35— on said portions 25 of the slides 21 up into the corresponding recesses provided in cover portions 13 and 14.

Spring 36, for opening the blades 5, is held in assembled position by rivet 37, and has arms 38—38, whose ends are bent at 39—39, whereby to engage portions 40—40 of the blades 5, when same are being closed, to thereby compress said spring.

To open the blades 5, after the same have been closed, whereby the spring 36 is held compressed, as seen in Fig. 2, involves the simple operation of pressing rearward or toward the center of the knife, on stud 32, so as to unlock the slide 21, which is then pushed in the opposite direction to thereby move the lever 20 and turn pivot 19 and member 18, which latter member abuts against the corresponding end of the spring 11 and frees head 9 or 10, in accordance with the blade 5 being opened, from the recess 7 of the blade 5. The blade 5, being released, will be forced into open position, by the tension of the corresponding arm 38 of the spring 36. The recesses 8 of the blades 5 engage with the heads 9 and 10 of the spring 11, whereby to hold said blades 5 in open position.

Figs. 7, 8, 9, and 10, show a modified manner for opening the blades 5, which modification comprises a coiled spring 50, housed in recesses 51 of the cover portions 13 and 14 of the knife. One end of each of the said springs 50 is secured to a rivet 53, upon which the blade 5 is fulcrumed, by means of a bracket 54, shown in Fig. 10, and the other end of the said spring 50 is secured to a stud 55 mounted in the heel of the blade 5, by means of a bracket, similar to bracket 54. The members —1— and 2 of the knife, are provided with grooves 56 for the movement of studs 55.

Fig. 12 shows a modification with respect to locking the slides 21. The modification embodies a spring 60 housed in a recess 61 in cover portions 13 and 14, there being such a spring on either side of the knife, and secured to the roof of said recesses 61. The rear extension of the slide 62, which corresponds to slide 21 of the former construction, is provided with a knob 64, whereby to be engaged by said spring 60 to hold the said slide 62 in given position.

Having thus described my invention, what I claim as new and desire to secure by Letters Patent is:

1. In a knife, the combination of a pair of blades, recesses in said blades, a spring, heads on either end of said spring, said heads adapted to engage said recesses in said blades, whereby to hold said blades in open or in closed position, a second spring for opening said blades, members integral with pivots actuated by levers for controlling the actuation of said first named spring, slides for controlling the actuation of said levers, rearward extensions on said slides, said extensions having very little thickness, whereby to form a spring in said rearward extensions, knobs on said rearward extensions, members having beveled surfaces for forcing said knobs into given position, whereby to hold said slides stationary, and studs for actuating said members having beveled surfaces.

2. In a knife, the combination of members, cover portions on said members, a pair of blades, recesses in said blades, a spring, heads on either end of said spring, recesses in said spring, whereby the greater extent of the yield of said spring will be adjacent its end portions, recesses in said blades, said heads on said spring adapted to engage said recesses in said blades, whereby to hold said blades in open or in closed position, a spring for opening said blades, members integral with pivots actuated by levers for controlling the actuation of said first named spring, slides for controlling the actuation of said levers, rearward extensions on said slides, said rearward extensions having very little thickness, whereby to form a spring in said rearward extensions, knobs on said rearward extensions, members having beveled surfaces, recesses in said handle members for housing said knobs, said members having beveled surfaces adapted to force said knobs into said recesses in said handle members, whereby to lock said slides in given position, and studs for actuating said members having beveled surfaces.

3. In a knife, the combination of a pair of blades, recesses in said blades, a spring, recesses in said spring, whereby to create a given yield therein, heads on either end of said spring, said heads adapted to engage said recesses in said blades, whereby to hold said blades in open or in closed position, a second spring for opening said blades, members, pivots, and levers, for controlling the actuation of said first named spring for opening said blades, slides having corrugated surfaces for controlling the actuation of said levers, rearward extensions on said slides, said rearward extensions being of very little thickness, whereby to form a spring portion in said rearward extensions, knobs on the ends of said rearward extensions, members having beveled surfaces for forcing said knobs into given position, whereby to lock said slides in given position, and studs for actuating said members having beveled surfaces.

In testimony whereof I have affixed my signature in the presence of two witnesses.

KARL H. ROTH.

Witnesses:
SAMUEL SLOAN,
T. L. WILDER.

Copies of this patent may be obtained for five cents each, by addressing the "Commissioner of Patents, Washington, D. C."